UNITED STATES PATENT OFFICE.

GEORGE R. STRICKLE, OF ALTON, LOUISIANA, ASSIGNOR OF ONE-THIRD TO N. T. POOL, OF FULTON COUNTY, GEORGIA, ONE-SIXTH TO H. MORTIMER LAMB, OF MONTREAL, CANADA, AND ONE-SIXTH TO A. W. STIRLING, OF FULTON COUNTY, GEORGIA.

PAINT.

1,234,816.  Specification of Letters Patent.  Patented July 31, 1917.

No Drawing.  Application filed September 8, 1916.  Serial No. 119,102.

*To all whom it may concern:*

Be it known that I, GEORGE R. STRICKLE, a citizen of the United States, residing at Alton, in the parish of St. Tammany, in the State of Louisiana, have invented a new and useful composition or paint for the preservation of exposed surfaces of wood, iron, steel, tin, or other metal, such as roofs, posts, bridges, barge or boat hulls exposed to either fresh or salt water, wood paving-blocks, viaducts of wood or structural iron or steel exposed to the action of locomotives, blasts, or sulfur fumes, piping, piling, ties, &c., placed in water, or underground, or in air, or on top of the ground.

The composition or paint consists of a mixture containing pine or coal tar, maltha, coach varnish, aluminum and potassium sulfate, crude lac resin, alcohol, a mixture of linseed oil and umber, peroxid of iron, sodium or potassium silicate, sodium biborate, a fibrous mineral substance, such as asbestos, calcium sulfate or calcium carbonate, a mineral filler, such as Portland cement, and, if necessary, a thinner, such as turpentine.

In preparing the composition or paint, I prefer to use the ingredients in about the following proportions: fifty gallons of pine or coal tar, five gallons of maltha, one gallon of coach varnish, one pound of aluminum and potassium sulfate, two pounds of crude lac resin, one quart of alcohol, one gallon of a mixture of linseed oil and umber, fifteen to thirty pounds of peroxid of iron, one gallon of either sodium or potassium silicate, one pound of sodium biborate, fifteen to thirty pounds of a fibrous mineral, such as asbestos, twenty to forty pounds of either calcium sulfate or calcium carbonate, thirty to fifty pounds of a mineral filler, such as Portland cement, and sufficient turpentine to thin the composition to a desirable consistency.

The ingredients are properly mixed and the compound is thinned with turpentine to a consistency permitting its application with a brush.

The composition is weather and sun proof and serves as a preservative for metal, and is of especial value as an inside coating for acid tanks. Metal surfaces are rendered impervious to rust and may be freely exposed to either salt or fresh water, or may be placed under ground without damage. Wood surfaces painted with or dipped in the composition or paint are not subject to decay either from weather or moisture, or when buried in the earth. The composition will stick to any surface and does not crack or peel or blister. It is elastic, but is not deleteriously affected by hot weather. Furthermore, when used as a hull paint for boats it will prevent the formation of barnacles.

The composition or paint has a high fire test and readily holds patches on roofs or other surfaces without the use of nails or the like, and, furthermore, requires no sand or gravel to prevent softening or running.

Moreover, the composition may be used to treat paper or felt for roofing and will preserve it and prevent it from becoming hard, for it keeps it plastic and renders it waterproof.

What is claimed is:—

1. A composition or paint, comprising tar, maltha, varnish, aluminum and potassium sulfate, resin, alcohol, linseed oil, peroxid of iron, sodium silicate, sodium biborate, a fibrous mineral, calcium sulfate, and a mineral filler, all substantially in the proportions described.

2. A composition or paint, comprising ingredients in proportions substantially as follows: tar fifty gallons, maltha five gallons, coach varnish one gallon, aluminum and potassium sulfate one pound, crude lac resin two pounds, alcohol one quart, linseed oil and umber one gallon, peroxid of iron from fifteen to thirty pounds, sodium silicate one gallon, sodium biborate one pound, asbestos fifteen to thirty pounds, calcium sulfate twenty to forty pounds, Portland cement thirty to fifty pounds, and turpentine in quantity sufficient to reduce the composition to a consistency to be applied by a brush.

GEO. R. STRICKLE.

Witnesses:
N. B. CARROLL,
A. C. MILLER.